US010465118B2

(12) United States Patent
Lee et al.

(10) Patent No.: US 10,465,118 B2
(45) Date of Patent: Nov. 5, 2019

(54) FIRE RETARDANT CABLES FORMED FROM HALOGEN-FREE AND HEAVY METAL-FREE COMPOSITIONS

(71) Applicant: General Cable Technologies Corporation, Highland Heights, KY (US)

(72) Inventors: Elliot Byunghwa Lee, Carmel, IN (US); Timothy John Clancy, Carmel, IN (US)

(73) Assignee: GENERAL CABLE TECHNOLOGIES CORPORATION, Highland Heights, KY (US)

( * ) Notice: Subject to any disclaimer, the term of this patent is extended or adjusted under 35 U.S.C. 154(b) by 0 days.

(21) Appl. No.: 16/001,617

(22) Filed: Jun. 6, 2018

(65) Prior Publication Data
US 2018/0355250 A1    Dec. 13, 2018

Related U.S. Application Data

(60) Provisional application No. 62/516,460, filed on Jun. 7, 2017.

(51) Int. Cl.
*C09K 21/04* (2006.01)
*C08K 3/016* (2018.01)
(Continued)

(52) U.S. Cl.
CPC ............ *C09K 21/04* (2013.01); *C08F 210/02* (2013.01); *C08J 3/24* (2013.01); *C08K 3/016* (2018.01);
(Continued)

(58) Field of Classification Search
CPC .......... C09K 21/04; C08K 3/016; C08K 3/04; C08K 3/22; C08K 3/2279; C08K 3/32;
(Continued)

(56) References Cited

U.S. PATENT DOCUMENTS 4,869,848 A     9/1989  Hasegawa et al.
5,357,026 A  *  10/1994  Younes ................ C08G 18/092
                                                    524/409
(Continued)

FOREIGN PATENT DOCUMENTS

CN       101508806      *  9/2009
CN       101704976 B       5/2012
(Continued)

OTHER PUBLICATIONS

Thomas, Shane; International Search Report and Written Opinion of the International Searching Authority, issued in International Application No. PCT/US2018/036285; dated Aug. 24, 2018; 9 pages.
(Continued)

*Primary Examiner* — Andargie M Aychillhum
*Assistant Examiner* — Michael F McAllister
(74) *Attorney, Agent, or Firm* — Ulmer & Berne LLP

(57) ABSTRACT

Fire retardant compositions including a base polymer, a fire retardant filler, and a fire retardant synergist are disclosed. The fire retardant compositions are halogen-free and heavy metal-free and can be crosslinked to form a cable insulation layer or a cable jacket. The cables can pass the UL VW-1 flame test. Cables having coverings formed from such fire retardant compositions are also described herein.

12 Claims, 1 Drawing Sheet

(51) Int. Cl.

| | | |
|---|---|---|
| *C08F 210/02* | (2006.01) | |
| *C08J 3/24* | (2006.01) | |
| *C08K 3/22* | (2006.01) | |
| *C08K 3/32* | (2006.01) | |
| *C08K 3/38* | (2006.01) | |
| *C08L 23/26* | (2006.01) | |
| *H01B 7/295* | (2006.01) | |
| *C08K 3/34* | (2006.01) | |
| *C08K 3/04* | (2006.01) | |
| *H01B 3/44* | (2006.01) | |
| *C08K 3/02* | (2006.01) | |

(52) U.S. Cl.
CPC ............... *C08K 3/04* (2013.01); *C08K 3/22* (2013.01); *C08K 3/2279* (2013.01); *C08K 3/32* (2013.01); *C08K 3/346* (2013.01); *C08K 3/38* (2013.01); *C08L 23/26* (2013.01); *H01B 3/448* (2013.01); *H01B 7/295* (2013.01); *C08F 2800/20* (2013.01); *C08J 2323/08* (2013.01); *C08K 2003/026* (2013.01); *C08K 2003/2224* (2013.01); *C08K 2003/327* (2013.01); *C08K 2003/387* (2013.01); *C08K 2201/019* (2013.01); *C08L 2201/02* (2013.01); *C08L 2203/202* (2013.01); *C08L 2205/025* (2013.01); *C08L 2312/08* (2013.01)

(58) Field of Classification Search
CPC .. C08K 3/346; C08K 3/38; C08K 2003/2224; C08K 2003/327; C08K 2003/387; C08K 2201/019; C08K 2003/026; C07D 241/50; C08F 210/02; C08F 2800/20; C08J 3/24; C08J 2323/08; C08L 23/26; C08L 2201/02; C08L 2203/202; C08L 2205/025; C08L 2312/08; H01B 3/448; H01B 7/295
USPC .............................. 524/436, 176; 174/110 A
See application file for complete search history.

(56) References Cited

U.S. PATENT DOCUMENTS

| | | | | |
|---|---|---|---|---|
| 5,378,539 | A * | 1/1995 | Chen | C08K 3/22 174/113 R |
| 5,525,757 | A * | 6/1996 | O'Brien | C08K 5/0066 174/121 A |
| 5,965,639 | A * | 10/1999 | Yamauchi | C08K 3/02 524/414 |
| 6,043,306 | A * | 3/2000 | Imahashi | C08K 3/22 524/436 |
| 6,107,413 | A * | 8/2000 | Mori | C08F 255/00 525/342 |
| 6,248,814 | B1 * | 6/2001 | Hironaka | C08K 3/02 524/80 |
| 6,339,189 | B1 * | 1/2002 | Caimi | H01B 3/441 174/120 C |
| 6,673,855 | B1 * | 1/2004 | Braga | C08K 3/22 524/86 |
| 8,197,943 | B2 | 6/2012 | Pinto et al. | |
| 8,703,288 | B2 | 4/2014 | Clancy | |
| 9,115,274 | B2 * | 8/2015 | Bates | C08L 23/02 |
| 9,336,927 | B2 * | 5/2016 | Sun | H01B 7/295 |
| 9,530,536 | B2 * | 12/2016 | Fujimoto | H01B 3/441 |
| 2002/0088642 | A1 * | 7/2002 | Caimi | H01B 3/441 174/121 A |
| 2003/0164483 | A1 * | 9/2003 | Scelza | C08K 3/02 252/601 |
| 2007/0185284 | A1 * | 8/2007 | Ok | C08L 67/00 525/425 |
| 2008/0015290 | A1 * | 1/2008 | Siripurapu | C08F 265/04 524/115 |
| 2009/0057009 | A1 * | 3/2009 | Sato | C08L 23/0815 174/72 A |
| 2009/0114417 | A1 * | 5/2009 | Nakayama | C08L 23/0869 174/110 SR |
| 2009/0183893 | A1 * | 7/2009 | Kambe | C08L 23/10 174/110 SR |
| 2009/0238957 | A1 * | 9/2009 | Clancy | C08L 23/02 427/117 |
| 2009/0314514 | A1 * | 12/2009 | Galletti | H01B 7/295 174/110 A |
| 2010/0101827 | A1 * | 4/2010 | Fujimoto | C08L 67/02 174/120 C |
| 2011/0180300 | A1 * | 7/2011 | Gu | C08K 5/0066 174/110 PM |
| 2012/0172510 | A1 | 7/2012 | Esseghir et al. | |
| 2012/0261163 | A1 * | 10/2012 | Tai | C08L 53/02 174/136 |
| 2013/0020107 | A1 * | 1/2013 | Pagliuca | H01B 3/441 174/120 SR |
| 2014/0030520 | A1 * | 1/2014 | Nakamura | H01B 3/308 428/368 |
| 2014/0272115 | A1 | 9/2014 | Shaffer et al. | |
| 2015/0004343 | A1 | 1/2015 | Levchick et al. | |

FOREIGN PATENT DOCUMENTS

| | | |
|---|---|---|
| CN | 103849197 A | 6/2014 |
| WO | 2016141086 A1 | 9/2016 |

OTHER PUBLICATIONS

Houston Wire & Cable Company; Cable Flame Tests, Technical Reference; 2012 Product Catalog; 1 page.

\* cited by examiner ant filler includes a metal hydroxide. The fire retardant synergist includes one or more of a zinc compound and red phosphorus. The crosslinkable fire retardant composition is substantially halogen-free and heavy metal-free.

FIRE RETARDANT CABLES FORMED FROM HALOGEN-FREE AND HEAVY METAL-FREE COMPOSITIONS

REFERENCE TO RELATED APPLICATIONS

The present application claims the priority of U.S. provisional application Ser. No. 62/516,460, entitled FIRE RETARDANT CABLES FORMED FROM HALOGEN-FREE AND HEAVY METAL-FREE COMPOSITIONS, filed Jun. 7, 2017, and hereby incorporates the same application herein by reference in its entirety.

TECHNICAL FIELD

The present disclosure generally relates to fire retardant cables formed from halogen-free and heavy metal-free compositions.

BACKGROUND

Certain cabling applications, including photovoltaic power generation applications, can require cables certified to pass specific qualifications such as fire resistance standards. Cables satisfying such fire resistance standards have conventionally achieved acceptable qualifications through the inclusion of halogenated compounds or heavy metal compounds, such as antimony, in the insulation and/or jacket layers of the cable. However, cables including halogenated compounds or heavy metal compounds suffer from a number of undesirable attributes including toxicity, high cost, and difficulty in simultaneously achieving multiple mechanical and electrical properties. It would be desirable to produce fire retardant cable compositions free of halogenated compounds or heavy metal compounds that can enable cables having coverings formed with such compositions to pass stringent fire resistance standards.

SUMMARY

In accordance with one embodiment, a cable includes one or more conductors and a covering surrounding the one or more conductors. The cable passes the Underwriter's Laboratory ("UL") VW-1 flame test. The covering includes a crosslinked fire retardant composition. The crosslinked fire retardant composition includes about 25% to about 60%, by weight, of a base polymer, about 20% to about 70%, by weight, of a fire retardant filler, and about 1% to about 15%, by weight, of a fire retardant synergist. The fire retardant filler includes a metal hydroxide. The fire retardant synergist includes one or more of a zinc compound and red phosphorus. The crosslinked fire retardant composition is substantially halogen-free and heavy metal-free.

In accordance with another embodiment, a cable includes one or more conductors and a covering surrounding the one or more conductors. The cable passes the Underwriter's Laboratory ("UL") VW-1 flame test. The covering includes a crosslinked fire retardant composition. The crosslinked fire retardant composition includes a base polymer, about 160 parts to about 200 parts, of a fire retardant filler, and about 10 parts to about 40 parts of a fire retardant synergist. The fire retardant filler includes magnesium hydroxide. The fire retardant synergist includes one or more of a zinc compound and red phosphorus. The crosslinked fire retardant composition is substantially halogen-free and heavy metal-free.

The crosslinked fire retardant composition exhibits a tensile strength of about 1,600 pounds per square inch ("psi") or greater.

In accordance with another embodiment, a crosslinkable fire retardant composition includes about 25% to about 60%, by weight, of a base polymer, about 20% to about 70%, by weight, of a fire retardant filler, and about 1% to about 15%, by weight, of a fire retardant synergist. The fire retardant filler includes a metal hydroxide. The fire retardant synergist includes one or more of a zinc compound and red phosphorus. The crosslinkable fire retardant composition is substantially halogen-free and heavy metal-free.

DETAILED DESCRIPTION

Figure 1:
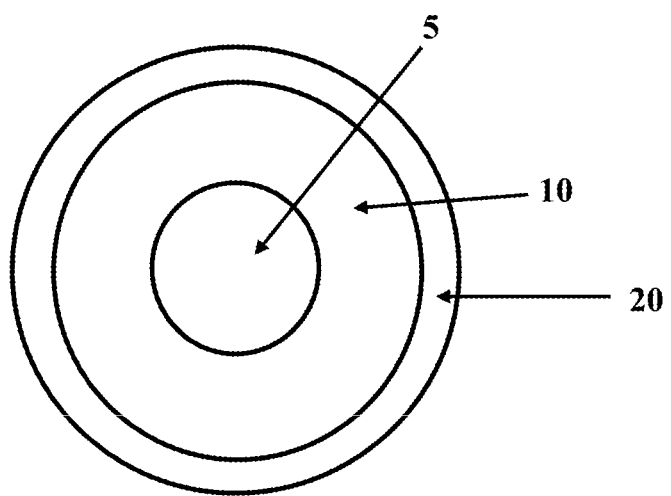
FIG. 1 depicts a cross-sectional view of a cable having a conductor, an insulation layer, and a jacket layer according to one embodiment.

As will be described herein, a fire retardant composition is disclosed which is useful for the formation of one, or more, coverings in a cable including cable insulation layers and cable jacket layers. Cables including insulation and/or jacket layers formed from the described fire retardant compositions can meet strict fire resistance qualifications including the Underwriter Laboratory ("UL") VW-1 flame test, the UL FV-1 flame test, and the EN60332-1-2 Vertical Flame Propagation test. Generally, fire retardant compositions exhibiting such properties can be crosslinked compositions formed of a base polymer, a fire retardant filler, and a fire retardant synergist.

According to certain embodiments, the fire retardant compositions described herein can be formed from any suitable base polymer. As can be appreciated, the base polymer is the component of which the remaining components of a fire retardant composition are compounded with. Generally, suitable base polymers can be selected from a wide variety of suitable polymers including polyolefin polymers and ethylene copolymers. For example, suitable base polymers can include polyolefins such as polyethylene and ethylene-based copolymers such as ethylene octene, ethylene butene, ethylene vinyl acetate, ethylene acrylic acid, ethylene methyl acrylate, ethylene ethyl acrylate, and ethylene butyl acrylate.

As can be appreciated, the base polymer can be selected based on various design considerations of the fire retardant compositions described herein. For example, in embodiments using a continuous vulcanization process, the base polymer can advantageously be a crosslinkable polymer such as ethylene vinyl acetate ("EVA"). As can be appreciated, EVA copolymers can have varying amounts of vinyl acetate. Suitable EVA copolymers for the fire retardant compositions described herein can have about 7% to about 40% vinyl acetate in certain embodiments. For example, in certain embodiments, vinyl acetate can constitute about 10% of a suitable EVA copolymer; in certain embodiments, vinyl acetate can constitute about 18% of a suitable EVA copolymer; in certain embodiments, vinyl acetate can constitute about 28% of a suitable EVA copolymer; and in certain embodiments, vinyl acetate can constitute about 35% of a suitable EVA copolymer. In certain embodiments, the base polymer of a continuously vulcanizable fire retardant composition as described herein can be an EVA copolymer having about 28% vinyl acetate.

As can be appreciated, other base polymers can also be suitable for fire retardant compositions which are cross-linked using alternative crosslinking processes. For example, in certain embodiments, the fire retardant compositions described herein can be crosslinked using a moisture cure process. In such embodiments, the base polymer can be selected from silane-modified base polymers such as silane-modified polyethylene and silane-modified ethylene copolymer (e.g., ethylene-octene copolymer, ethylene vinyl acetate copolymer, etc). Suitable silane-modified base polymers can be prepared by pre-grafting the base polymer with a silane coupling agent. For example, suitable base polymers can be prepared by using a peroxide agent to attach vinyl silane to a polyolefin in certain embodiments. As can be appreciated, the silane groups can then be crosslinked using a moisture cure process. In certain embodiments, base polymers with pre-grafted silane can alternatively be commercially obtained.

Generally, examples of suitable silane coupling agents can include one, or more, of a monomeric vinyl silane, an oligomeric vinyl silane, a polymeric vinyl silane, and an organosilane compound. Examples of suitable organosilane compounds can include γ-methacryloxypropyltrimethoxysilane, methyltriethoxysilane, methyltris(2-methoxyethoxy) silane, dimethyldiethoxysilane, vinyltris(2-methoxyethoxy) silane, vinyltrimethoxysilane, vinyltriethoxysilane, octyltriethoxysilane, isobutyltriethoxysilane, isobutyltrimethoxysilane, propyltriethoxysilane, and mixtures or polymers thereof.

The base polymer can amount to about 25% to about 60%, by weight, of the fire retardant composition. For example, for continuous vulcanization crosslinked compositions, the base polymer can be about 25% to about 40%, by weight, of the fire retardant composition. In certain such embodiments, the base polymer can be about 30% to about 40% or 30% to about 35%, by weight of the fire retardant compositions. For moisture cured fire retardant compositions, the base polymer can be about 40% to about 60%, by weight, of the composition.

Suitable fire retardant fillers for the fire retardant compositions described herein can include metal hydroxide compounds. For example, one or more of magnesium hydroxide and aluminum hydroxide can be included as a fire retardant filler. In certain embodiments, only one of either magnesium hydroxide or aluminum hydroxide can be included as a fire retardant filler. In certain embodiments, magnesium hydroxide can be used as the sole fire retardant filler. The fire retardant composition can include an EVA base polymer and can be crosslinked using a continuous vulcanization process.

Generally, the fire retardant filler can be added to the base polymer in any suitable manner. For example, the fire retardant filler can be added directly to the base polymer in certain embodiments. In such embodiments, a fire retardant filler, such as magnesium hydroxide, can be included at about 100 parts to about 250 parts, by weight, of the fire retardant composition, at about 125 parts to about 225 parts, by weight, of the fire retardant composition, at about 140 parts to about 210 parts, by weight, of the fire retardant composition, or at about 160 parts to about 200 parts, by weight, of the fire retardant composition. In certain such embodiments, about 20% to about 70%, of a fire-retardant composition can be a fire retardant filler.

Alternatively, a fire retardant filler can be added as a masterbatch composition to the base polymer. For example, a suitable fire retardant filler can be dispersed in a masterbatch of polyolefin or ethylene copolymer (such as EVA) in certain embodiments. In such embodiments, the fire retardant filler can be included at about 10% to about 50%, by weight, of the fire retardant composition or at about 25% to about 45%, by weight, of the fire retardant composition.

As can be appreciated, suitable fire retardant fillers can have a variety of additional qualities. For example, suitable fire retardant fillers can have a low ionic content in certain embodiments. In certain embodiments, suitable fire retardant fillers can have an average particle size of from about 0.5 micron to about 10 microns including, for example, about 0.5 micron to about 3 microns.

In certain embodiments, a fire retardant filler can optionally be further pre-treated with a surface treatment agent. Pre-treatment of a fire retardant filler with a surface treatment agent, such as, for example, a silane coupling agent, can improve the processability and properties of the fire retardant filler by improving adhesion and crosslinkability of the fire retardant filler with the base polymer. Suitable surface treatment agents can generally include any of the silane coupling agents suitable for silane modification of a base polymer.

It has been unexpectedly found that use of a fire retardant synergist in combination with a fire retardant filler can allow for the formation of cables which meet the flame standards of the UL VW-1 flame test, the UL FV-1 flame test, and/or the EN60332-1-2 Vertical Flame Propagation test. As can be appreciated, the UL VW-1 flame test and the UL FV-1 flame test are provided in UL 2556.

Specifically, it has been found that the inclusion of a zinc compound or a phosphorus compound, acting as a fire retardant synergist, can allow for the construction of cables with such desirable properties. Generally, suitable zinc compounds can include zinc borate, zinc stannate, basic zinc molybdate, zinc calcium molybdate, zinc oxide, zinc sulfide, and combinations thereof. An example of a suitable phosphorus compound is red phosphorus.

In certain embodiments, it can be advantageous to include a combination of both a zinc compound and a phosphorus compound. For example, it can be advantageous to include both zinc borate and red phosphorus in certain embodiments. In other certain embodiments, it can be advantageous to include only one of a phosphorus compound and a zinc compound as a fire retardant synergist.

Generally, fire retardant synergists can be included in any suitable manner. For example, zinc compounds, such as zinc borate, can be added directly to the fire retardant compositions described herein while a phosphorus compound, such as red phosphorus, can be added as part of a masterbatch. If a fire retardant synergist is added as part of a masterbatch, it can be advantageous for the synergist to be dispersed in the same polymer as the polymer of any other components added via a masterbatch such as a fire retardant filler. In certain embodiments, both of the fire retardant filler and the fire retardant synergist can be added as part of a masterbatch. In other certain embodiments, only one of, or neither of, the fire retardant filler and the fire retardant synergist can be added as part of a masterbatch.

In certain embodiments, a fire retardant synergist can be included in the fire retardant compositions described herein at about 10 parts to about 50 parts. For example, in certain embodiments, about 20 parts to about 30 parts of a zinc borate fire retardant synergist and about 2 parts to about 10 parts of red phosphorus fire retardant synergist can be included. On a weight percentage basis, about 5% to about 15%, of such fire retardant compositions can be a fire retardant synergist. In embodiments including the fire retardant synergist as part of a masterbatch, the masterbatch can be included at about 2% to about 6%, or about 3% to about 4%, by weight of the fire retardant composition.

As can be appreciated, the fire retardant compositions described herein can optionally further include additional components. For example, the fire retardant compositions can include one or more crosslinking agents and initiators, colorants, processing agents, antioxidants, additional polymers, and stabilizers in various embodiments. As can be appreciated, any of the additional components can be directly added to the fire retardant compositions described herein or can be introduced using a masterbatch. Generally, any additional components can be included at about 1% to about 15%, by weight of the fire retardant compositions. In certain embodiments, the additional components can be added at about 3% to about 10%, by weight, of the fire retardant compositions.

As can be appreciated, a fire retardant composition can include a crosslinking agent in certain embodiments to facilitate crosslinking. For example, in certain embodiments curing the fire retardant composition through a continuous vulcanization process, peroxide cross-linking agents such as α,α'-bis(tert-butylperoxy) disopropylbenzene, di(tert-butylperoxyisopropyl)benzene, dicumyl peroxide, and tert-butylcumyl peroxide can be included in the fire retardant compositions described herein. Blends of multiple peroxide cross-linking agents can also be used, such as for example, a blend of 1,1-dimethylethyl 1-methyl-1-phenylethyl peroxide, bis(1-methyl-1-phenylethyl) peroxide, and [1,3 (or 1,4)-phenylenebis(1-methylethylidene)] bis(1,1-dimethylethyl) peroxide. In such embodiments, a fire retardant composition can include about 1 part to about 4 parts, by weight, of a peroxide cross-linking agent. In certain embodiments, the compositions can include about 1 part to about 3 parts, by weight, of a peroxide cross-linking agent.

As can be appreciated however, other crosslinking agents can alternatively be included when other processes are used to fully, or partially, crosslink the described fire retardant compositions. For example, fire retardant compositions crosslinked through a moisture curing process can further include a catalyst as a crosslinking agent. In such embodiments, silane treatment agents used to graft silane to the base polymer can also be present. As can be further appreciated, fire retardant compositions crosslinked with radiation, electron-beam irradiation, an addition curing process, or a platinum curing process can include appropriate crosslinking agents or catalysts.

According to certain embodiments, a colorant can also be added to a fire retardant composition. Suitable colorants can include, for example, carbon black, cadmium red, iron blue, or a combination thereof. In embodiments including carbon black as a colorant, the carbon black does not act as a fire retardant filler or synergist. In certain embodiments, the colorant can be included from about 3 parts to about 10 parts, by weight of the fire retardant composition.

A processing aid can be included to improve the processability of a fire retardant composition by forming a microscopic dispersed phase within a polymer carrier. During processing, the applied shear can separate the processing aid (e.g., processing oil) phase from the carrier polymer phase. The processing aid can then migrate to the die wall to gradually form a continuous coating layer to reduce the backpressure of the extruder and reduce friction during extrusion. The processing oil can generally be a lubricant, such as ultra-low molecular weight polyethylene (e.g., polyethylene wax), stearic acid, silicones, anti-static amines, organic amities, ethanolamides, mono- and di-glyceride fatty amines, ethoxylated fatty amines, fatty acids, zinc stearate, stearic acids, palmitic acids, calcium stearate, zinc sulfate, oligomeric olefin oil, or combinations thereof. In certain embodiments, a lubricant can be included from about 1 part to about 3 parts, by weight, of the fire retardant composition.

In certain embodiments, a processing oil can alternatively be a blend of fatty acids, such as the commercially available products: Struktol® produced by Struktol Company of America (Stow, Ohio), Akulon® Ultraflow produced by DSM N.V. (Birmingham, Mich.), MoldWiz® produced by Axel Plastics Research Laboratories (Woodside, N.Y.), and Aflux® produced by Rhein Chemie (Chardon, Ohio).

In certain embodiments, a fire retardant composition can alternatively be substantially free of any lubricant, processing oil, or processing aids. As used herein, "substantially free" means that the component is not intentionally added to the fire retardant composition, or alternatively, that the component is not detectable with current analytical methods.

According to certain embodiments, suitable antioxidants for inclusion in a fire retardant compositions can include, for example, amine-antioxidants, such as 4,4'-dioctyl diphenylamine, N,N'-diphenyl-p-phenylenediamine, and polymers of 2,2,4-trimethyl-1,2-dihydroquinoline; phenolic antioxidants, such as thiodiethylene bis[3-(3,5-di-tert-butyl-4-hydroxyphenyl)propionate], 4,4'-thiobis(2-tert-butyl-5-methylphenol), 2,2'-thiobis(4-methyl-6-tert-butyl-phenol), benzenepropanoic acid, 3,5-bis(1,1-dimethylethyl)4-hydroxy benzenepropanoic acid, 3,5-bis(1,1-dimethylethyl)-4-hydroxy-C13-15 branched and linear alkyl esters, 3,5-di-tert-butyl-4hydroxyhydrocinnamic acid C7-9-branched alkyl ester, 2,4-dimethyl-6-t-butylphenol tetrakis{methylene-3-(3',5'-ditert-butyl-4'-hydroxyphenol) propionate}methane or tetrakis {methylene3-(3',5'-ditert-butyl-4'-hydrocinnamate}methane, 1,1,3tris(2-methyl-4-hydroxyl-5-butylphenyl)butane, 2,5,di t-amyl hydroquinone, 1,3,5-tri methyl2,4,6tris(3,5di tert butyl-4-hydroxybenzyl) benzene, 1,3,5tris(3,5di-tert-butyl-4-hydroxybenzyl)isocyanurate, 2,2-methylene-bis-(4-methyl-6-tert butyl-phenol), 6,6'-di-tert-butyl-2,2'-thiodi-p-cresol or 2,2'-thiobis(4-methyl-6-tert-butylphenol), 2,2-ethylenebis(4,6-di-t-butyl-phenol), triethyleneglycol bis{3-(3-t-butyl-4-hydroxy-5methylphenyl)propionate}, 1,3,5-tris(4tert-butyl-3-hydroxy-2,6-dimethylbenzyl)-1,3,5-triazine-2,4,6-(1H,3H, 5H)trione, 2,2-methylenebis{6-(1-methylcyclohexyl)-p-cresol}; sterically hindered phenolic antioxidants such as pentaerythritol tetrakis(3-(3,5-di-tert-butyl-4-hydroxyphenyl)propionate); hydrolytically stable phosphite antioxidants such as tris(2,4-ditert-butylphenyl)phosphite; toluimidazole, and/or sulfur antioxidants, such as bis(2-methyl-4-(3-n-alkylthiopropionyloxy)-5-t-butylphenyl)sulfide, 2-mercaptobenzimidazole and its zinc salts, pentaerythritoltetrakis(3-lauryl-thiopropionate), and combinations thereof. Antioxidants can be included in fire retardant compositions at concentrations about 7 parts, by weight, or less of the fire retardant composition in certain embodiments; from about 1 part to about 5 parts, by weight, in certain embodiments; and from about 1 part to about 3 parts, by weight, in certain embodiments. As can be appreciated, it can be advantageous in certain embodiments to use a blend of multiple antioxidants such as, for example, a blend of toluimidazole and a second antioxidant.

Additional polymers can be included in the fire retardant compositions described herein in certain embodiments. For example, relatively small quantities of an olefin copolymer or an EVA polymer can be included. In embodiments including additional EVA copolymer, the additional EVA copolymer can have a different amount of vinyl acetate than the base polymer. For example, in certain embodiments, any additional EVA can have a vinyl acetate concentration of about 10% to about 30%. As can be further appreciated however, the additional polymers can also be included as a consequence of being a component of a masterbatch for another component such as a fire retardant synergist. Additional polymers can be present at about 20 parts by weight or less. Alternatively, additional polymers can constitute about 10%, by weight, or less of the fire retardant compositions described herein.

Details of additional components suitable for inclusion in a fire retardant composition are further disclosed in U.S. Pat. No. 9,115,274 which is hereby incorporated by reference.

In certain embodiments, the fire retardant compositions described herein can be substantially free of compatibilizer. For example, the compositions can be substantially free of polyethylene grafted anhydride maleic.

One or more layers (or coverings) of a cable can be formed of the fire retardant compositions described herein. For example, in certain embodiments, an outer, or jacket, layer can be formed of the fire retardant compositions described herein. In certain such embodiments, insulation layers, if included, can be formed from a different composition such as crosslinked polyethylene. As can be appreciated, the selection of compositions utilized to form the other layers can be chosen, in part, based on design considerations such as crosslinking and processing. For example, it can be useful to choose an insulation layer which can be simultaneously extruded and/or crosslinked at the same time as the fire retardant compositions described herein. As can be appreciated, an insulation layer formed of a silane-functionalized polyethylene can be simultaneously crosslinked with a jacket layer formed of a fire retardant composition including a silane-modified base polymer using a moisture cure process.

As can be appreciated, the fire retardant compositions disclosed herein can be substantially free of dangerous compounds such as heavy metals (including antimony) and halogens while retaining excellent physical properties and fire retardant properties. For example, cables including a jacket layer formed from the fire-retardant compositions described herein can pass one, or more, of the VW-1 flame test, the FV-1 flame test, and the Vertical Flame Propagation of EN60332-1-1.

As can be appreciated, the VW-1 and FV-1 vertical flame tests require cables to extinguish a flame within 60 seconds after a specified flame is applied to the cable. Additionally, a paper sample located above the cable must not catch on fire. Samples are required to pass at least 3 consecutive samples to pass the respective flame tests. The Vertical Flame Propagation test of EN60332-1-1 is a test for vertical flame propagation for a single insulated wire or cable using a 1 kW pre-mixed flame.

In addition to the VW-1, FV-1, and Vertical Flame Propagation flame tests, the formation of one or more insulation and/or jacket layers from the fire retardant compositions described herein can permit a cable (e.g., a power cable) to meet, or pass, certain additional physical properties and qualification tests. For example, the described fire retardant compositions can have an elongation at break when measured in accordance with ASTM D412 (2010) using molded plaques of about 150% or more, in certain embodiments, about 180% or more, and in certain embodiments, about 200% or more. Mechanically, plaques made from such fire retardant compositions can also have a tensile strength of about 1,700 pounds per square inch ("psi") or more according to certain embodiments; and in certain embodiments about 1,800 psi or more. In certain embodiments, cables formed from the described fire retardant compositions can also pass the 250° C. hot creep test of EN 60811-507.

As can be appreciated, fire retardant compositions having good physical, electrical, and mechanical properties can be well suited for use in a variety of applications. For example, the halogen-free and antimony-free nature of power cables including jacket layers formed from the fire retardant compositions disclosed herein can be particularly suited for solar applications which have strict flame spread requirements. Additionally, the fire retardant compositions can be useful to form jacket layers for other types of electrical cables. For example, the fire retardant compositions described herein can be suitable to form jacket layers for transit application cables, building wires and cables, data communication cables, nuclear power cables, and other cables which must be fire resistant. As can be appreciated, the ability of cables formed from the fire retardant compositions to pass both the VW-1 and FV-1 flame tests can also simplify sourcing by eliminating the need to select different cables for different markets.

Generally, the fire retardant compositions described herein can be prepared by blending the components/ingredients in conventional masticating equipment, for example, a rubber mill, brabender mixer, banbury mixer, Buss-Ko kneader, farrel continuous mixer, or twin screw continuous mixer. The components can be premixed before addition to the base polymer (e.g., polyolefin). The mixing time can be selected to ensure a homogenous mixture.

Fire retardant compositions described herein can be applied to a cable using an extrusion method. In a typical extrusion method, an optionally heated conductor can be pulled through a heated extrusion die, such as a cross-head die, to apply a layer of melted fire retardant composition onto the conductor. Upon exiting the die, if the composition is adapted as a thermoset composition, the conducting core with the applied fire retardant composition layer may be passed through a heated vulcanizing section, or continuous vulcanizing section and then a cooling section, such as an elongated cooling bath, to cool. Multiple layers of the fire retardant composition can be applied through consecutive extrusion steps in which an additional layer is added in each step. Alternatively, with the proper type of die, multiple layers of the composition can be applied simultaneously. As can be appreciated, a fire retardant composition as disclosed herein can also be applied over one or more previously-applied layers. For example, a fire retardant composition can be applied as an outer layer in certain embodiments and can surround an inner insulation layer formed of, for example, crosslinked polyethylene.

As can be appreciated, power cables can be formed in a variety of configurations including as single-core cables, multi-core cables, tray cables, inter-locked armored cables, solar cables, and continuously corrugated welded ("CCW") cable constructions. The conductors in such power cables can be surrounded by one or more insulation layers and/or jacket layers formed of the fire retardant compositions disclosed herein.

An illustrative, single-core, power cable is depicted in a cross-sectional view in FIG. 1. The single-core power cable in FIG. 1 includes a conductor 5, an insulation layer 10, and a jacket layer 20. In such an example, the insulation layer 10 or the jacket layer 20 could be formed with the fire retardant composition described herein. In certain embodiments, the insulation layer 10 can be formed of crosslinked polyethylene and the jacket layer 20 can be formed of a fire retardant composition described herein. As can be appreciated, the cable depicted in FIG. 1 can pass the UL VW-1 flame test, the UL FV-1 flame test, and/or the EN60332-1-1 Vertical Flame Propagation test. It is understood that cables having only an insulation layer or jacket layer are also contemplated.

The conductor, or conductive element, of a power cable, can generally include any suitable electrically conducting material. For example, a generally electrically conductive metal such as, for example, copper, aluminum, a copper alloy, an aluminum alloy (e.g. aluminum-zirconium alloy), or any other conductive metal can serve as the conductive material. As will be appreciated, the conductor can be solid, or can be twisted and braided from a plurality of smaller conductors. The conductor can be sized for specific purposes. For example, a conductor can range from a 22 AWG conductor to a 4/0 AWG cable in certain embodiments or can range in diameter from 0.32 mm$^2$ to 108 mm$^2$ in other certain embodiments.

EXAMPLES

Tables 1A and 2A depict the parts per hundred rubber ("PHR") of several Example fire-retardant compositions. Weight percentages of each component are also listed. Tables 1B and 2B depict the properties of the Example fire retardant compositions of Tables 1A and 2A respectively. Tables 1A and 1B include Comparative Examples 1 to 7 which do not exhibit satisfactory physical results. Tables 2A and 2B include Inventive Examples 8 to 11 which exhibit satisfactory physical results.

The Hot Creep test and flame tests (FV-1 and VW-1) were performed on a 14 American Wire Gauge ("AWG") copper cable including the Example compositions as a 30 mil coating. Inventive Example 11 was formed on 14 AWG copper cable as a 45 mil covering. The properties of Comparative Example 8, and Inventive Example 11, were evaluated on a molded wire. Cables passed the 250° C. hot creep test when they passed the requirements of EN 60811-507.

TABLE 1A

| Compound | Ex. 1 | Ex. 2 | Ex. 3 | Ex. 4 | Ex. 5 | Ex. 6 | Ex. 7 |
|---|---|---|---|---|---|---|---|
| EVA (28% vinyl acetate) | 100 (33.8%) | 100 (32.7%) | 100 (32.7%) | 100 (34.6%) | 100 (34.6%) | 100 (33.4%) | 100 (33.4%) |
| Magnesium hydroxide (MDH) | 175 (59.1%) | 175 (57.1%) | 175 (57.1%) | 175 (60.6%) | 165 (57.1%) | 175 (58.2%) | 175 (58.3%) |
| Zinc borate | — | — | 10 (3.3%) | — | 20 (6.9%) | 20 (6.7%) | — |
| Antimony trioxide | 14 (4.7%) | 24 (7.8%) | 14 (4.6%) | — | — | — | — |
| Clay | — | — | — | 10 (3.4%) | — | — | — |
| Aluminum polyphosphate | — | — | — | — | — | — | 24 (8.0%) |
| Antioxidant | 1-3 (1%) | 1-3 (1%) | 1-3 (1%) | — | — | — | — |
| Carbon black | 4 (1.4%) | 4 (1.3%) | 4 (1.3%) | 4 (1.4%) | 4 (1.4%) | 4 (1.3%) | — |

TABLE 1B

| Property | Ex. 1 | Ex. 2 | Ex. 3 | Ex. 4 | Ex. 5 | Ex. 6 | Ex. 7 |
|---|---|---|---|---|---|---|---|
| Tensile Strength (PSI) | 1780 | 1710 | 1780 | 2330 | 1720 | 1780 | 1470 |
| Elongation at Break (%) | 174 | 175 | 174 | 130 | 186 | 167 | 175 |
| FV-1 (samples passing/total) | (0/3) | (0/3) | (2/4) | (1/3) | — | — | (2/3) |
| VW-1 (samples passing/total) | — | — | — | (0/3) | (1/3) | (1/3) | (3/3) |

TABLE 2A

| Compound | Ex. 8 | Ex. 9 | Ex. 10 | Ex. 11 |
|---|---|---|---|---|
| EVA (28% vinyl acetate) | 100 (33.0%) | 100 (32.4%) | 100 (34.2%) | 100 (33.2%) |
| EVA (10% to 30% vinyl acetate) | — | — | 14 (4.8%) | 4 (1.3%) |
| Magnesium hydroxide (MDH) | 175 (57.8%) | 175 (56.6%) | 170 (58.2%) | 170 (56.5%) |
| Zinc borate | 24 (7.9%) | 30 (9.7%) | — | 24 (8.0%) |
| Red phosphorus | — | — | 8 (2.7%) | 3 (1.0%) |
| Carbon black | 4 (1.3%) | 4 (1.3%) | — | — |

TABLE 2B

| Property | Ex. 8 | Ex. 9 | Ex. 10 | Ex. 11 |
|---|---|---|---|---|
| Tensile Strength (PSI) | 1760 | 1780 | 1710 | 1850 |
| Elongation at Break (%) | 192 | 174 | 230 | 180 |
| FV-1 (samples passing/total) | — | — | (3/3) | — |
| VW-1 (samples passing/total) | (3/3) | (3/3) | (3/3) | (2/3) |
| 250° C. Hot Creep Test | Pass | Pass | Pass | Pass |

As depicted in Tables 1B and 2B, Inventive Examples 8 to 11 demonstrated passing results on the FV-1 and VW-1 flame tests while Comparative Examples 1 to 7 did not demonstrate simultaneously passing both FV-1 and VW-1 or failed to exhibit sufficient tensile strength values. It is believed that Inventive Example 11 would pass the VW-1 flame test if formed as a 30 mil covering instead of a 45 mil covering.

Table 3A below depicts the components, by weight percentage, of additional fire retardant compositions formed from component masterbatches. Table 3B depicts the corresponding physical properties of Examples 12 to 14.

TABLE 3A

| Compound | Ex. 12 | Ex. 13 | Ex. 14 |
| --- | --- | --- | --- |
| Ethylene copolymer (pretreated with silane coupling agent) | 54% | 50% | 48% |
| Olefin copolymer | — | 2% | 7% |
| Magnesium hydroxide (MDH) | 38% | 35% | 33% |
| Red phosphorus | — | 4% | 3% |
| Cross-linking catalyst | 4% | 5% | 5% |
| Carbon black | 4% | 4% | — |

TABLE 3B

| Property | Ex. 12 | Ex. 13 | Ex. 14 |
| --- | --- | --- | --- |
| Tensile Strength (PSI) | 2400 | 1620 | 1640 |
| Elongation at Break (%) | 400 | 500 | 540 |
| VW-1 (samples passing/total) | (0/3) | (3/3) | (2/3) |

Example 13 is considered an Inventive Example because it demonstrates high tensile strength, elongation at break percentages, and passes the VW-1 flame test. Examples 12 and 14 are Comparative Examples because each fail the VW-1 flame test.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A cable comprising:
  one or more conductors; and
  a halogen-free and heavy metal-free covering surrounding the one or more conductors, the covering comprising a crosslinked fire retardant composition comprising:
    about 30% to about 40%, by weight, of a base polymer;
    about 50% to about 65%, by weight, of a fire retardant filler, the fire retardant filler comprising a metal hydroxide; and
    about 1% to about 15%, by weight, of a fire retardant synergist, the fire retardant synergist comprising zinc borate and red phosphorus, wherein the crosslinked fire retardant composition comprises about 5% to about 10% zinc borate and about 1% to about 5% red phosphorus; and
  wherein the cable passes the Underwriter's Laboratory ("UL") VW-1 flame test.

2. The cable of claim 1 further passes one or more of the UL FV-1 flame test and the EN60332-1-2 Vertical Flame Propagation test.

3. The cable of claim 1, wherein the covering is a jacket.

4. The cable of claim 3 further comprises an insulation layer disposed between the one or more conductors and the jacket, wherein the insulation layer comprises crosslinked polyethylene.

5. The cable of claim 1, wherein the covering exhibits one or more of a tensile strength of about 1,600 pounds per square inch ("psi") or greater and an elongation at break of about 150% or greater.

6. The cable of claim 1 passes the 250° C. hot creep test of EN 60811-507.

7. The cable of claim 1, wherein the crosslinked fire retardant composition further comprises a colorant, and wherein the colorant comprises carbon black.

8. The cable of claim 1, wherein the crosslinked fire retardant composition is free of a processing aid or compatibilizer.

9. The cable of claim 1, wherein the base polymer comprises an ethylene vinyl acetate copolymer.

10. The cable of claim 9, wherein the ethylene vinyl acetate copolymer comprises about 10% to about 35%, vinyl acetate.

11. The cable of claim 1, wherein the fire retardant filler is magnesium hydroxide.

12. The cable of claim 1, wherein the crosslinked fire retardant composition is crosslinked with a peroxide crosslinking process.

* * * * *